United States Patent [19]
Larsen

[11] Patent Number: 4,771,735
[45] Date of Patent: Sep. 20, 1988

[54] DOG FEEDER AND METHODS

[76] Inventor: Darwin W. Larsen, 46 W. 1st North, Logan, Utah 84321

[21] Appl. No.: 91,177

[22] Filed: Aug. 31, 1987

[51] Int. Cl.⁴ .......................... A01K 1/10; A01K 5/00; A01R 39/00
[52] U.S. Cl. ...................................................... 119/62
[58] Field of Search .......................................... 119/62

[56] References Cited
U.S. PATENT DOCUMENTS
2,933,063 4/1960 Geerlings .............................. 119/62
2,972,979 2/1961 Struck .................................... 119/62

Primary Examiner—Robert Peshock
Attorney, Agent, or Firm—Lynn G. Foster

[57] ABSTRACT

A self-feeding dog feeder that has a capacity for several days feeding, constructed in such a way that the feed is protected from inadvertent contamination or loss, while still allowing easy access by the desired dog only.

1 Claim, 2 Drawing Sheets

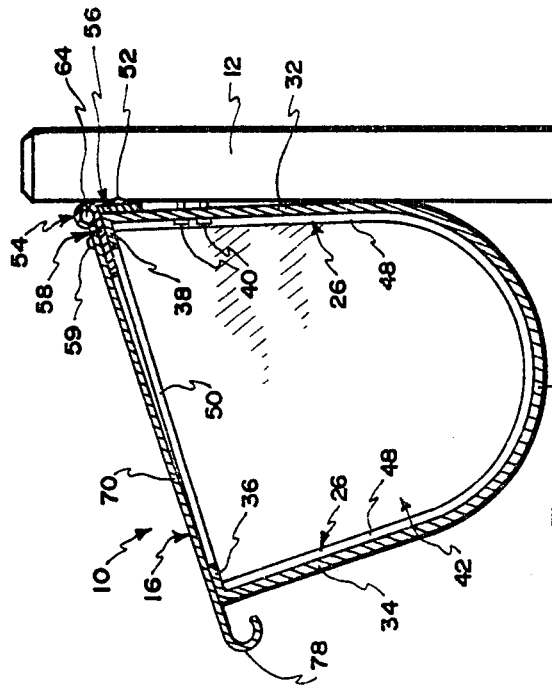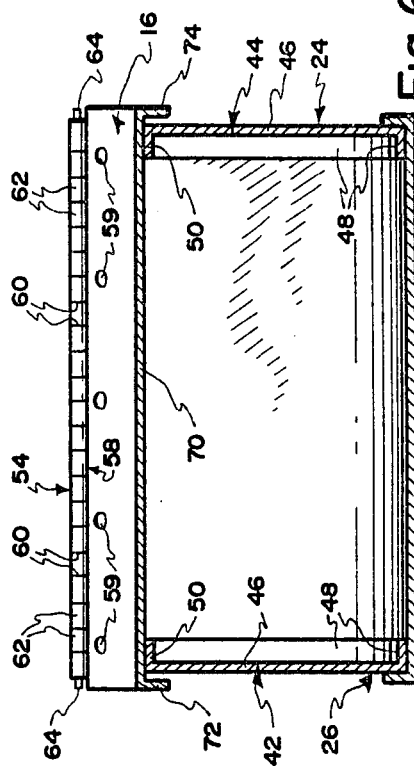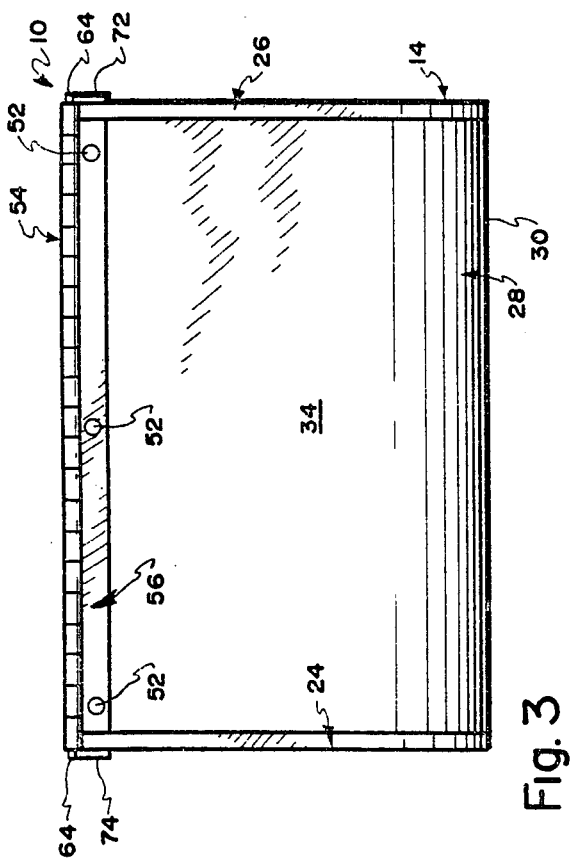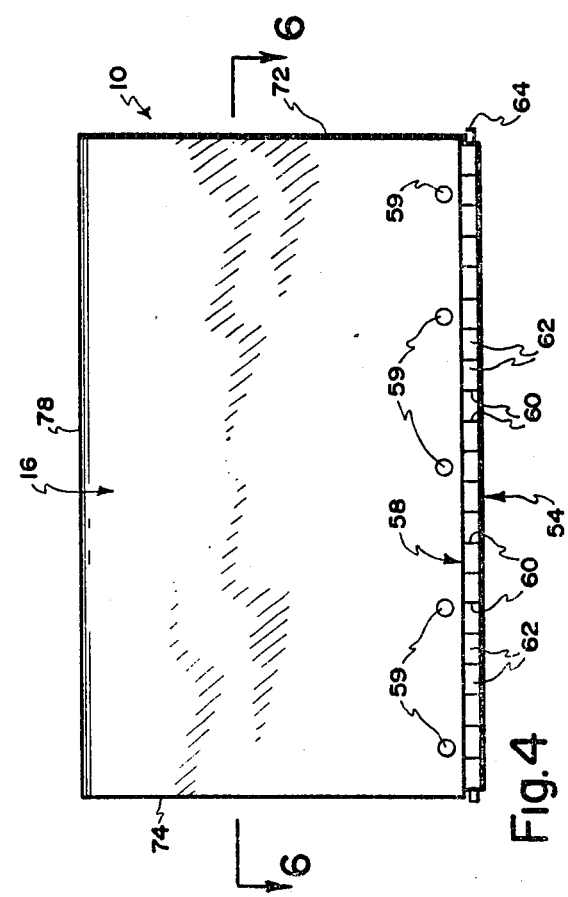

DOG FEEDER AND METHODS

FIELD OF INVENTION

The present invention relates to a dog feeder adapted for self-feeding of dog food over a prolonged period of time without significant waste or deleterious effect upon the dog food.

PRIOR ART

For the dog owner, feeding has always been a messy chore. In addition, a frustrating dilemma presents itself when the owner is absent for a long time, such as at vacation time. The love for the dog by its owner creates a desire to care well for the dog. Nevertheless, a need to be absent on business, for a vacation and the like often has required that the dog be left in the possession of a friend or relative to insure adequate care.

Another option is to take the pet along. This is often either extremely awkward or impossible, since many hotels and motels do not allow pets, and because bringing the dog along can make the trip unduly troublesome. This approach is essentially impossible if the dog not house trained.

A further option is to leave the dog at a kennel. This, however, is cost-prohibitive for many persons.

When the dog is left with family or friends, the dog, being uncomfortable at a strange place, may stray from the unfamiliar surroundings, trying to find its way back home. Further, leaving the dog with a friend or with family can often create hard feelings, especially if the dog causes some damage or injury.

Still another option is to leave the dog home and have someone feed it there periodically. However, if the person selected to do the feeding is not dependable, this can harmfully effect the dog and can also create ill will between the owner and the person left in charge of the dog.

The final option available is to leave a large quantity of food out for the dog to eat over an extended period of time. Using this option, the food is normally left exposed to the sun and precipitation which spoil the food. Birds, rodents and other animals are known to eat large quantities of unattended dog food.

To solve these problems, self-feeding dog food devices have been developed for use by the dog owner. These devices, however, generally resemble automatic chicken feeders, and in such a configuration, birds and stray animals are still allowed access to the food, as are the sun, rain and snow. This results because the dog food moves downward by gravity into an open dog feeding trough, which is not covered and, therefore, is exposed to the outside elements. Once the food is substantially saturated by rain or snow, prior art feeders tend to become clogged, leaving the dog without an on-going continuing source of edible food. On the other hand, as birds and stray animals eat the food in the feeder, the food supply is greatly diminished, producing the same costly result, no food or requiring a shorter trip by the owner to accommodate earlier replenishment of the supply of dog food.

Prior art dog feeding devices also often expose the dog food housed therein to certain unhealthy circumstances, such as bacterial contamination, vermin infestation, flies and other insects. Also, prior art dog food feeders are not self cleaning so that food often becomes stale. Furthermore, many such devices are made in such a way and of such materials so that they are often damaged or destroyed as the dog chews upon them.

BRIEF SUMMARY AND OBJECTS OF THE INVENTION

In brief summary, the present invention is directed to a self-feeding dog feeder for use when the need arises to leave the dog unattended for an extended time and for routine use as well. Preferably, the present invention comprises a covered dog feeder formed of weather-resistant, non-corrosive material. The construction of such a feeder, in accordance with the principles of the present invention, includes formation of a trough-shaped food holder capable of being securely positioned for repeated access by a dog. The food holding trough is in turn covered by a hinged or pivotable lid, accommodating outdoor use, which may be readily opened by the dog once the dog is trained but will return to its normally closed position when the dog has finished eating. The dog feeder of the present invention conserves food and avoids contamination thereof by outside elements, bacteria, birds and stray animals, vermin infestation, flies and other insects. Dog feeders according to the present invention are preferably shaped so that they are self cleaning or, in other words, the acts of feeding by the dog also serve to clean the interior of the feeder so that any accumulation of stale food, which would otherwise occur, is prevented. Potential damage or destruction of feeders of this invention due to chewing by the dog is greatly alleviated. The present invention assumes that the dog has an adequate supply of water.

With the foregoing in mind, it is a principal object of the present invention to provide a novel dog feeder and related methods.

It is a further significant object to provide an improved dog feeder which allows a dog to be adequately self-fed for short or extended periods of time, as desired.

It is another dominant object to provide a dog feeder which materially reduces the chore and mess of feeding a dog or of frequently cleaning the feeder.

It is another important object of this invention to provide a dog feeder that allows self-feeding without contamination due to exposure to adverse weather.

It is a further valuable object to provide a dog feeder that conserves food for the dog by preventing access to the food by various birds, stray animals and the like.

It is another important object to provide a dog feeder which is easy to install in an appropriate stationary position.

A further object of importance is the provisions of a dog feeder which requires training for a dog to use, but only a limited amount of training.

It is another significant object to provide a limited-access dog feeder that serves as a training device for a dog to allow only the trained dog access to the dog food within the feeder.

It is a further valuable object of the present invention to provide a novel dog feeder which is normally closed to provide significant health and hygenic advantages.

An additional paramount object is the provision of a unique dog feeder which is necessarily cleaned by the dog as the dog eats.

Another significant object is to provide a novel dog feeder which provides improved economy by avoiding wasting of dog food, providing for long term durability and requires less attention and time from the dog owner.

These and other objects and features of the present invention will be apparent from the detailed description taken with reference to the accompanying drawings.

BRIEF DESCRIPTION OF THE DRAWINGS

FIG. 3 is a rear elevational view of the dog feeder of FIG. 1, shown removed from the post;

FIG. 4 is a top plan view of the dog feeder of FIG. 1 removed from the post, showing hinged and sloped lid thereof;

FIG. 5 is a cross-section taken along lines 5—5 of FIG. 1; and

FIG. 6 is a cross-section taken along lines 6—6 of FIG. 4.

DETAILED DESCRIPTION OF THE ILLUSTRATED EMBODIMENT

Figure 2:
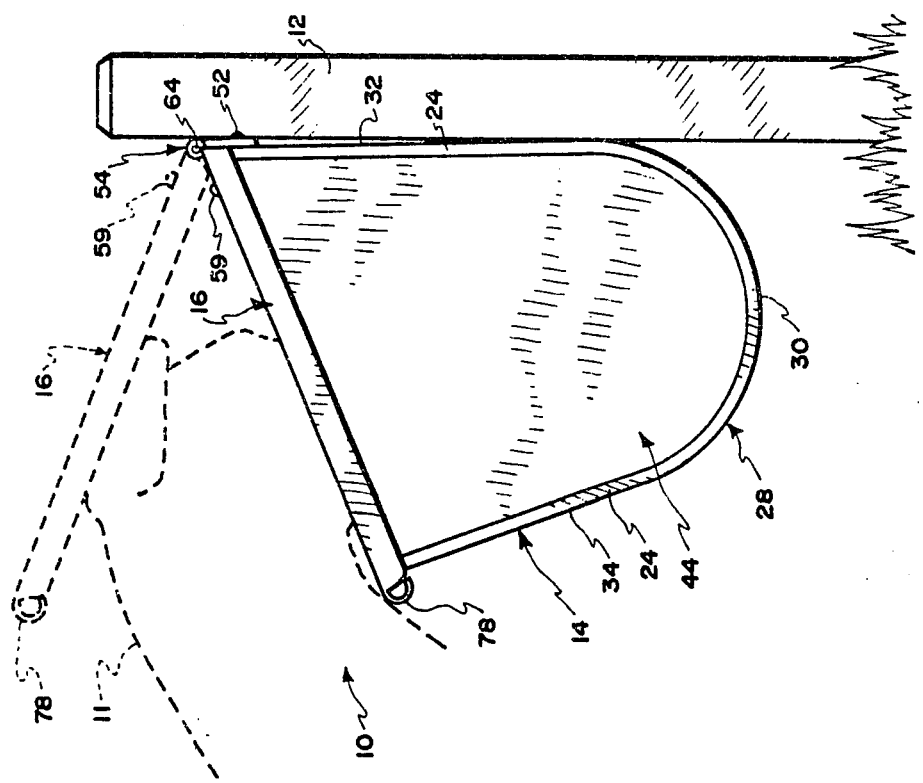
FIG. 2 is a side elevational view of the dog feeder of FIG. 1 taken along lines 2—2 of FIG. 1, showing also the lid held in an elevated open position by a dog.
Figure 1:
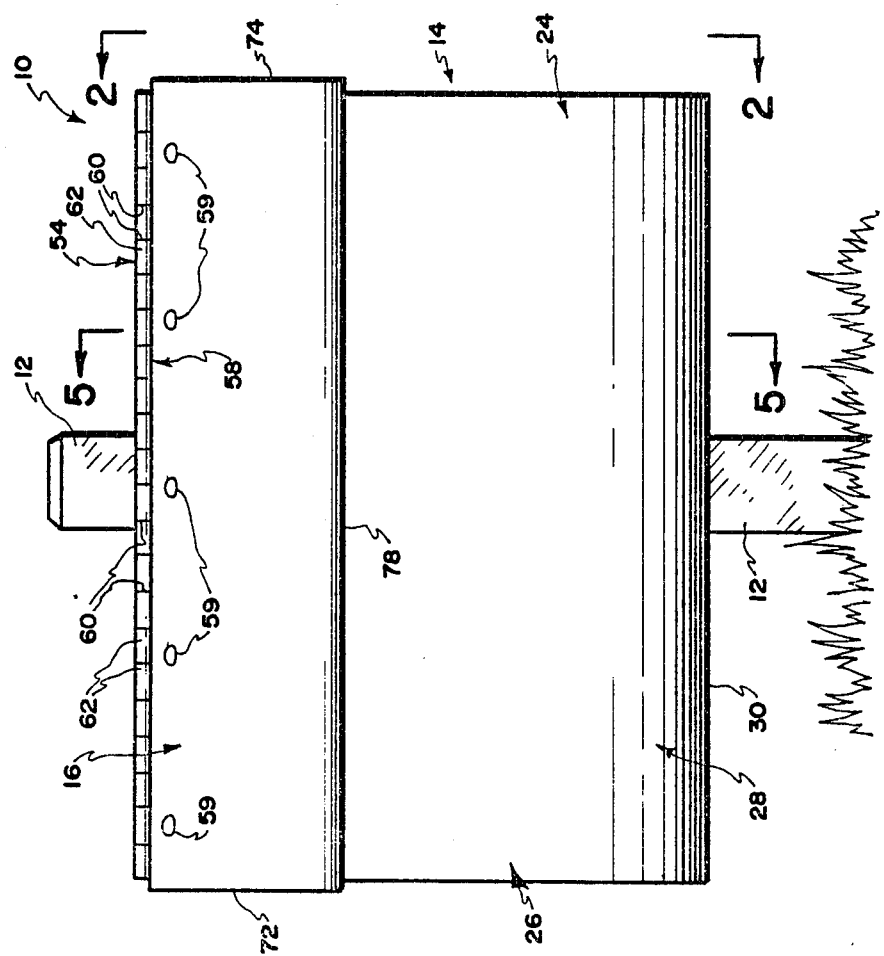
FIG. 1 is a front elevational view of a dog feeder fabricated according to the principles of the present invention, shown as being secured to a post in its normally closed position at an elevation for ready access by a dog having some limited training.

Reference is now made to the drawings wherein like numerals are used to describe like parts throughout and specifically to FIG. 1, which shows a dog feeder, generally designated 10, fabricated according to the principles of the present invention, illustrated as having been mounted securely to a vertical post 12 at an elevation accommodating ready access thereto by a dog 11 (FIG. 2).

In the illustrated embodiment, a feed holder storage bin portion 14 of the feeder 10 is illustrated as being constructed of galvanized sheet metal having uniform thickness and is shown as being generally trough-shaped. Any other sturdy weather-resistant, food-compatible material could be used without departing from the present invention. This trough-shaped configuration generally facilitates the dog's ability to eat the food in the feeder by directing the food downward under force of gravity to the central curved lower region of the trough. Thus, the dog cleans the trough as it eats the food. In the installed position, the lid 16 of the feeder 10 is canted forward to insure gravity closure. This allows rain and other moisture to run off of the feeder lid 16 and thereby avoid weather-related contamination of the dog food within the feeder 10.

The feeder trough or bin 14 is generally an open top large container. Bin 14, as illustrated, is formed from three separate pieces of sheet metal 28, 42 and 44 joined along the contiguous edges thereof by reinforced crimped metal corner joints or seams 24 and 26. These corner joints are or may be sheet metal lap joints reinforced, for example, by soldering. The front, back and bottom walls of the bin 14 are comprised of one piece of sheet metal 28 formed into a curved trough. The sheet 28, as illustrated, thus comprising three integral parts, i.e. a lower acuate bottom 30, a generally vertically directed back wall 32 and a front wall 34. The walls 30, 32 and 34 are illustrated as being of uniform thickness and width throughout.

The front wall 34 is angular in respect to the vertical, on the order of 30 degrees, although other front wall configurations could be used. The front wall 34, at the top thereof, ends in a transverse, inwardly directed lip or flange 36, shown as having the same thickness and essentially the same width as wall 34. Flange 36 thus forms an acute angle in respect to the horizontal, as illustrated in FIG. 5.

The rear wall 32, at the top thereof, ends in a inwardly directed lip or flange 38, shown as having the same thickness and essentially the same width as wall 32. Flange 38 forms an acute angle in respect to the horizontal, as illustrated in FIG. 5, such that flanges 36 and 38 are disposed in the same plane. This arrangement causes the top lid of the feeder 10 to be sloped when in its normally closed position of FIG. 5, as explained herein in greater detail. Thus, the combination of the wall lengths and the slope of the flanges 36 and 38 produces the sloping characteristic of the feeder 10 which facilitates moisture run off and access to the food by the dog 11.

The back wall 32 also provides a site for attachment of the feeder 10 to any desired mounting structure, such as the post 12, through use of conventional fasteners, such as nails 40. The feeder 10 is to be stably mounted at an appropriate height or elevation above the ground or floor surface to accommodate ready access by the specific dog to be fed. If desired two ground-embedded posts can be used with two sets of nail or screw holes placed in the back wall. Also, wire may be inserted through the mounting holes for securing the dog feeder to a chain link or like fence. Further, the dog feeder can be mounted with any suitable fastener or connector structure, such as nails and screws, to almost any desired mounting site, such as a kennel, a house, a wall, a garage, the inside or outside of a dog house, etc.

The other two pieces of sheet metal, illustrated as comprising the presently preferred feeder 10, comprise side wall sections 42 and 44, which are identical but of opposite hand. See FIGS. 2, 5 and 6. The side wall sections 42 and 44 are substantially equidimensional and parallel. Parallel flat side wall sections 42 and 44 are shaped to precisely close the sides of the trough section 28 to form the bin 14, leaving only the top of the feeder 10 accessible, through the lid thereof, and preventing undesired loss of feed placed in the bin 14, contamination, in its various forms, and access by birds and stray animals. Each side wall sections 42 and 44 comprises a central flat planar wall 46, an integral partly curvilinear flange 48 which is illustrated and contiguously engaging the trough section 28 in sealed relation, as, for example, by soldering, although other sealants and adhesives, bonding agents or connectors could be used. Each side wall section 42 and 44 further comprises an upper integral linear flange 50 which is angularly disposed in respect to the horizontal, being shown as being within the same plane as flanges 36 and 38 and being contiguously connected thereto at each side in edge-to-edge relation by soldered mitre joints or the like. The flanges 48 and 50 are illustrated as being of the same thickness as the associated wall 46.

Attached along the upper edge of the back wall 32 by three rivets 52 (FIG. 3) is the lower half 56 of a hinge structure, generally designated 54. The upper hinge half 58 of the hinge 54 is attached by five rivets 59 along the lid, as shown in FIG. 4. The hinge 54 is illustrated as being a piano hinge with alternating interlocking slots 60 and male loops 62. The loops 62 of each hinge section 56 and 58 receive a wire rod 64 to hold the hinge sections together while accommodating rotation of the lid 16 in respect to the hinge section 56. This rotation into the open position, shown in dotted lines in FIG. 2, is easily accomplished by a dog using its nose based upon only limited training. Rotation from the open to the closed position is accomplished by force of gravity.

The lid 16, in the illustrated embodiment, is formed of lightweight sheet metal, although any other lightweight weather-resistant, food-inert material could also be used. The lid 16 comprises a central planar wall 70 which is connected along the back edge thereof to the hinge section 58 by rivets 59. The planar wall 70 merges into two downwardly-directed side lips or flanges 72 and 74, shown to be of the same thickness as wall 70. The flange 72 and 74 aid in preventing entry into the interior of the feeder 10 of undesired elements of weather and other contaminates. The front edge 76 of the wall 70 comprises a rolled lip 78. See FIG. 5 especially. This rolled lip 18 extends well past the front wall 34 of the trough 14 a sufficient distance to allow a dog to use its nose to lift the the lid 16. The curvature of lip 78 and its otherwise smooth configuration eliminates potential harm to the dog's nose which might otherwise occur while the dog is using the feeder 10.

The hinge section 58, as before mentioned, is attached to the underside of the lid 16 by five rivets 59 and thus a permanent connection is provided between the lid 16 and trough or bin 14.

During use, the trough 14 is first filled with food of a sufficient quantity to meet the nutritional requirements of the dog until the next feeding. The size of the feeder 10 may, therefore, vary depending on length of time the owner expects to be away from the dog, during a trip, for example. The dog owner at some point must train the dog to use the feeder by causing the dog to become familiar with the need to lift and the manner in which the dog must lift the lid 16. The training can consist of various techniques and, standing alone, the training is not a part of the present invention. Without training, stray untrained dogs will be excluded from access to the food within the bin 14.

When put into use, the self-feeding feeder provides a convenient method of feeding a dog over both a short interval as well as a prolonged period of time. Not only is it valuable when the dog owner takes a trip, but it also helps to eliminate the mess encountered in the normal methods of everyday dog feeding. A continuous and adequate supply of food is insured for the dog, which is readily accessible only by the owners dog with a minimal of training, and waste associated with the prior art feeders is eliminated. The food supply is not shared with birds and other stray animals because of the security provided by the present feeder. Spoilage and contamination of the dog food due to the weather, bacterial invasion or vermin or insect infestations are avoided.

The bin 14 is constructed so that it is self-cleaning, i.e. the dog cleans the trough as he eats. Thus, improved hygene results. There is no messy spillage of food, upon the ground or in any other way. Therefore, the supply of food is conserved and its depletion is strictly limited to that consumed by the trained dog.

The invention may be embodied in other specific forms without department from the spirit or essential characteristics thereof. The present embodiment, is, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. A dry dog food feeding device whereby entry of moisture is prevented comprising:

a single bin comprising a single hollow compartment closed by arcuate bottom wall means, side wall means, front wall means and rear wall means, the bin further comprising a large top opening and a large volume adequate to receive a supply of dry food to meet several days' requirement of a dog, the bin comprising support means placing the hollow compartment in an asymmetrical disposition with the back wall means being substantially vertically disposed and the front wall means being disposed at a substantial angle in respect to the vertical whereby the dry food flows toward a low point defined by the arcuate bottom wall means which is closer to the front wall means than to the rear wall means;

a single normally closed lid removably covering and extending transversely in four directions beyond the limits of the top opening of the bin to prevent entry of undesired contaminates, insects, vermin, birds and stray animals, the lid being substantially sloped downwardly from back to front;

hinge means offset out of alignment with a vertical projection of the bin opening, the hinge means pivotally linking back wall means of the bin at the top thereof and the back of the lid to prevent moisture entry and accommodate lid displacement by the animal owner to replenish the supply of dry food and by the dog in accessing to the food;

the force of gravity accommodating return of the lid to the normally closed sloped position when the dog ceases to feed.

* * * * *